United States Patent
Washio (10) Patent No.: US 7,811,358 B2
(45) Date of Patent: Oct. 12, 2010

(54) DEAERATOR AND DEAERATING METHOD

(75) Inventor: Seiichi Washio, Okayama (JP)

(73) Assignee: National University Corporation Okayama University, Okayama-shi (JP)

( * ) Notice: Subject to any disclaimer, the term of this patent is extended or adjusted under 35 U.S.C. 154(b) by 473 days.

(21) Appl. No.: 11/885,774

(22) PCT Filed: Mar. 7, 2006

(86) PCT No.: PCT/JP2006/304323

§ 371 (c)(1),
(2), (4) Date: Sep. 6, 2007

(87) PCT Pub. No.: WO2006/095712

PCT Pub. Date: Sep. 14, 2006

(65) Prior Publication Data

US 2008/0210097 A1        Sep. 4, 2008

(30) Foreign Application Priority Data

Mar. 7, 2005    (JP) ............................ 2005-063196

(51) Int. Cl.
*B01D 19/00*        (2006.01)
(52) U.S. Cl. ................... 95/1; 95/262; 95/266; 96/156; 96/197
(58) Field of Classification Search ........................ 95/1, 95/260, 262, 266; 96/156, 194, 197
See application file for complete search history.

(56) References Cited

U.S. PATENT DOCUMENTS 5,064,449 A    11/1991    Ford et al.

(Continued)

FOREIGN PATENT DOCUMENTS

JP            03-118803            5/1991

(Continued)

OTHER PUBLICATIONS

Kamiyama et al.; Effect of degassing of Hydraulic Oil Cavitation Suppression; Japan Society of Mechanical Engineers Chugoku Shikoku Shibu Sokai Koenkai Koen Ronbunshu No. 055-1, 2005, p. 301-302.*

(Continued)

*Primary Examiner*—Frank M Lawrence
*Assistant Examiner*—Douglas J Theisen
(74) *Attorney, Agent, or Firm*—Jordan and Hamburg LLP (57)    ABSTRACT

The present invention provides a deaerator and a deaerating method which enable the continuous deaeration of a liquid at a low cost. That is, with respect to a pipe which supplies a fluid by a supply means, a rip-out portion which rips out a fluid from an inner peripheral surface of the pipe is provided at a predetermined position in the inside of the pipe, and the fluid is supplied at a predetermined flow rate by a flow control means which adjusts the flow rate of the liquid which is supplied through the pipe so as to form a cavity on a downstream side of the rip-out portion. A through hole which communicates with the cavity is formed in the pipe, and deaeration of the liquid is performed by exhausting gases in the inside of the cavity by suction means such as a vacuum pump via the through hole.

7 Claims, 4 Drawing Sheets

U.S. PATENT DOCUMENTS

| | | | |
|---|---|---|---|
| RE36,082 E * | 2/1999 | Ishimura et al. | 65/32.5 |
| 6,294,005 B1 * | 9/2001 | Inoue et al. | 96/193 |
| 7,384,451 B2 * | 6/2008 | Shiraishi et al. | 95/19 |
| 2004/0050253 A1 * | 3/2004 | Skoglund et al. | 95/266 |

FOREIGN PATENT DOCUMENTS

| | | | |
|---|---|---|---|
| JP | 7132201 | * | 5/1995 |

OTHER PUBLICATIONS

May 1999 Japan Society of Mechanical Engineers, "Observation of Cavitation Inception in Hydraulic Oil Flow" Seiichi Washio et al. pp. 1643-1651.

* cited by examiner

DEAERATOR AND DEAERATING METHOD

BACKGROUND OF THE INVENTION

The present invention relates to a deaerator and a deaerating method which performs deaeration for removing gaseous components dissolved in a liquid, and more particularly to a deaerator and a deaerating method which can perform the deaeration by continuous processing without using batch processing.

Conventionally, in supplying a liquid using a narrow pipe such as a hydraulic circuit, due to the generation of bubbles in the inside of the pipe, there may arise a trouble in supplying the liquid and hence, the liquid is preliminarily deaerated thus suppressing the generation of the bubbles.

In such a case, usually, the deaeration is performed such that a liquid to be deaerated is stored in the inside of a depressurizing device, and air in the inside of the depressurizing device is exhausted by suction using a vacuum pump or the like thus reducing the pressure in the inside of the depressurizing device. Since it is necessary to hermetically seal the depressurizing device in performing the deaeration, deaeration is performed by batch processing.

Although such deaeration by batch processing has an advantage that a large quantity of liquid can be processed at a time, the batch processing is the discontinuous processing and hence, the batch processing has a drawback that oil which is not exchanged for a relatively long period such as a working fluid which may be represented by oil used in a hydraulic brake of an automobile or oil used in a hydraulic circuit of a construction machine, for example, cannot be periodically deaerated besides predetermined timing for exchange.

Further, in the inside of the depressurizing device, an atmosphere exposure surface which constitutes a contact surface between the stored liquid and atmosphere is relatively large and hence, there also exists a drawback that air is again dissolved into the liquid from the atmosphere exposure surface after the deaerating processing so that it is difficult to maintain a deaeration effect.

Accordingly, as a device which performs the deaeration of a liquid by continuous processing without batch processing, there has been proposed a device which includes a vacuum vessel in which the degree of vacuum is increased preliminarily and a pipe which supplies the liquid to the vacuum vessel, and performs the deaeration by continuously supplying a processing liquid to the inside of the vacuum vessel (for example, see patent document 1).

Further, as another device, there has been also proposed a device which performs deaeration by forming fine bubbles by generating the cavitation in a liquid to be deaerated and by removing these fine bubbles (for example, see patent document 2).

Under such circumstances, inventors of the present invention have found, in the course of studying a cavitation phenomenon in a liquid, a phenomenon that when the super cavitation which is one mode of the cavitation phenomenon is generated, a cavity is formed stably in the inside of a pipe through which a liquid is made to flow (for example, see non-patent document 1).

Further, the inventors of the present invention also have found that the inside of the cavity which is formed in the inside of the pipe due to the super cavitation is stably held in an extremely low pressure state which is close to the vapor pressure of the liquid and hence, gas which is dissolved in the liquid contacting the cavity is separated into the cavity, that is, the deaeration of liquid is performed in the cavity formed in the inside of the pipe.

Patent document 1: Japanese Patent laid-open hei07(1995)-132201

Patent document 2: Japanese Patent laid-open hei03(1991)-118803

Non-Patent document 1: Seiichi Washio and three others, "observation of cavitation inception in hydraulic oil flow", collective treaties of Japan Society of Mechanical Engineers, Corporate Juridical Person Japan Society of Mechanical Engineers, May 1999, Vol. 65, No. 633, B edition, p. 1643-1651.

SUMMARY OF THE INVENTION

In continuously performing the deaeration of a liquid, when the deaeration is performed by supplying the liquid into a vacuum vessel whose degree of vacuum is preliminarily increased, the structure for maintaining the inside of the vacuum vessel at the high degree of vacuum stably is liable to be complicated thus giving rise to a drawback that the deaerator becomes relatively large and a manufacturing cost is pushed up.

On the other hand, when the deaeration is performed such that the fine bubbles are formed by generating the cavitation in the liquid and by removing these fine bubbles, to surely remove the fine bubbles, a portion of liquid is also removed together and hence, there exist a possibility that a quantity of liquid is decreased and it is necessary to provide a return-flow passage which returns the removed liquid. Accordingly, there exists a possibility that the manufacturing cost of the deaerator is pushed up.

In view of such circumstances, the inventors of the present invention arrive at an idea that it is possible to continuously perform the deaeration by making use of a cavity generated by the super cavitation such that gases dissolved in the liquid is separated into the cavity and the separated gases are sequentially discharged from the cavity, and have arrived at the present invention which enables the continuous deaeration at a low cost.

A deaerator of the present invention is directed to a deaerator which performs the deaeration of a liquid supplied to the inside of a pipe by a supply means, wherein the deaerator includes a flow control portion which adjusts a flow rate of the liquid supplied through the inside of the pipe, a rip-out portion which forms a cavity which is brought into contact with an inner wall of the pipe by ripping out the liquid from the inner wall of the pipe, and a suction portion which sucks gases in the inside of the cavity through a through hole which is formed in the pipe in a state that the through hole communicates with the cavity.

Further, the deaerator of the present invention also has following constitutional features.

(1) A restricting body which restricts the flow of the liquid is provided in the inside of the pipe thus forming a narrowed flow passage in the inside of the pipe and, at the same time, the cavity is formed in the inside of the narrowed flow passage.

(2) A dynamic pressure reduction portion which reduces a dynamic pressure of the liquid is provided on a downstream side of the restricting body.

(3) A deaeration region in which the rip-out portion, the suction portion and the dynamic pressure reduction portion are arranged in this order is provided in multiple stages in the pipe.

(4) The dynamic pressure reduction portion is a tank which temporarily reserves the liquid.

(5) The rip-out portion is formed by intersecting an upstream-side end surface of the restricting body and a peripheral surface of the restricting body.

Further, a deaerating method of the present invention is directed to a deaerating method which performs the deaeration of a liquid which is supplied to the inside of a pipe by a supply means, wherein a rip-out portion which rips out the liquid from an inner peripheral surface of the pipe is provided in the inside of the pipe at a predetermined position and, at the same time, a through hole which communicates with a suction means which sucks gases in the inside of the pipe is formed in the pipe on a downstream side of the peeling portion, and a liquid is supplied into the inside of the pipe at a predetermined flow rate by a flow control means which adjusts a flow rate of the liquid supplied into the inside of the pipe, and a cavity which communicates with the through hole is formed at a downstream side of the rip-out portion, and the gases in the inside of the cavity is sucked by a suction means thus deaerating the liquid.

According to the present invention, by providing the rip-out portion for forming the cavity, the through hole which communicates with the formed cavity and the suction means which is communicably connected with the through hole and sucks the air in the inside of the cavity formed in the pipe through which the liquid is supplied, it is possible to continuously perform the deaeration of the liquid in the course of the supply of the liquid in the inside of the pipe and hence, it is possible to perform the deaeration processing at an extremely low cost.

Particularly, according to the deaerator of the present invention, it is possible to perform the deaeration processing by installing the deaerator at an arbitrary position of the pipe which supplies the liquid and hence, the degree of freedom in mounting the deaerator can be enhanced.

DETAILED DESCRIPTION OF THE INVENTION

A deaerator and a deaerating method of the present invention are characterized by performing the deaeration by generating the super cavitation which is one form of the cavitation in the inside of a pipe in which a liquid to be deaerated is supplied.

That is, when the super cavitation is generated in the inside of the pipe, a cavity having a certain stable shape is formed in the inside of the pipe. Since the inside of the cavity is in an extremely low-pressure state close to the vapor pressure of the liquid, gases are separated into the cavity from the liquid which flows in contact with the cavity whereby the liquid is deaerated.

Further, a through hole which communicates with the cavity is formed in the pipe, and the gases in the inside of the cavity is sucked and exhausted through the through hole using a suction means such as a vacuum pump or the like thus preventing the establishment of an equilibrium state between the precipitation of gases into the inside of the cavity and the dissolution of the gases in the inside of the cavity into the liquid whereby the precipitation of the gases into the inside of the cavity from the liquid is contiguously generated thus enabling the continuous deaeration.

In forming the cavity in the inside of the pipe, it is necessary to provide a point of cavitation generation which is technically referred to point of flow separation" in the pipe. The point of flow separation can be arranged at an arbitrary position of the pipe and hence, it is possible to form the cavity generated by the super cavitation at a downstream side of the point of flow separation by making use of the rip-out action at the point.

Here, the mere provision of the point of flow separation in the inside of the pipe can not attain the generation of the super cavitation. Accordingly, a flow control portion which adjusts a flow rate of the liquid which is supplied to the inside of the pipe is provided to the pipe, and the super cavitation is generated by adjusting the flow rate of the liquid by the flow control portion thus forming the cavity having a certain stable shape.

The conditions for generating the super cavitation vary widely depending on an inner diameter and a shape of the pipe, a shape of the rip-out point, the viscosity and a flow rate of the liquid and the like and hence, by adjusting these conditions, it is possible to adjust a size and a shape of the cavity produced by the super cavitation.

The rip-out point is formed in a shape which allows the ripping-out of the liquid supplied through the inside of the pipe from the inner surface of the pipe and, in general, it is desirable that the rip-out point is formed in a sharp-corner shape.

In this manner, according to the deaerator and the deaerating method of the present invention, since the gases which are dissolved in the liquid can be separated and removed by making use of the cavity generated by the super cavitation and hence, it is possible to perform the deaeration of the liquid using the extremely simple constitution whereby it is possible to provide the deaerator at a low cost.

As the liquid to which the deaerator and the deaerating method of the present invention are applicable, it is desirable to use the liquid which has the relatively low vapor pressure. In case of the liquid which has the high vapor pressure, when the liquid is brought into contact with the cavity generated by the super cavitation, the liquid is evaporated thus giving rise to a possibility that a quantity of the liquid is decreased. Here, when the deaerator is used in a mode where the decrease of a quantity of the liquid does not cause any serious problems or when the recovery structure which recovers the evaporated liquid is provided to the deaerator, it is also possible to apply the deaerator or the deaerating method of the present invention to the liquid which has the high vapor pressure.

Figure 1:
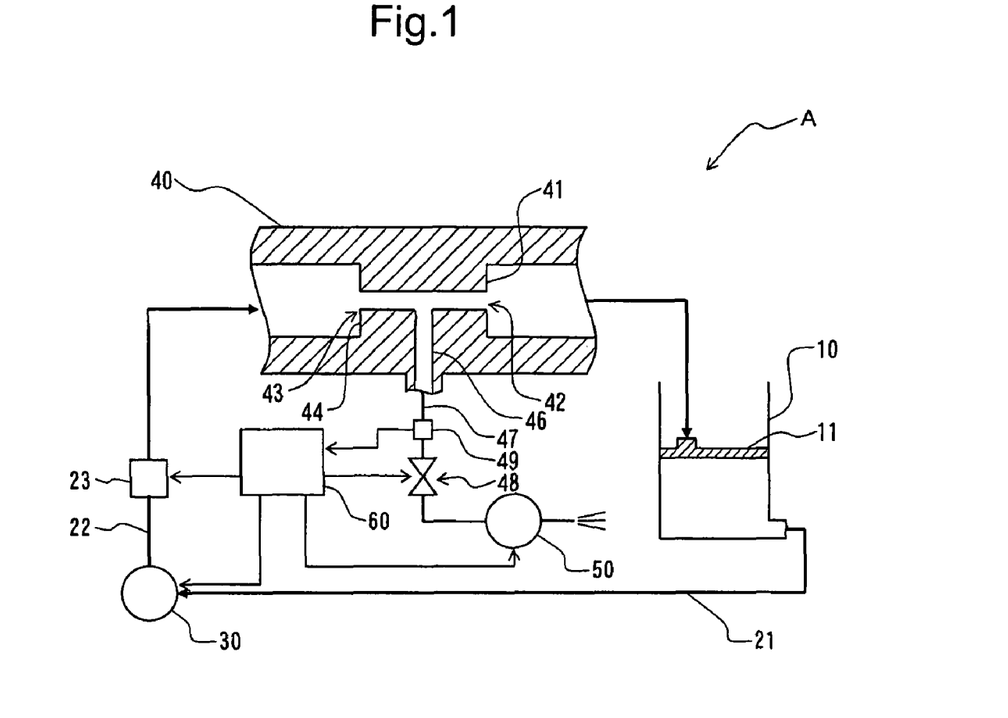
FIG. 1 is a general schematic view of a deaerator according to an embodiment of the present invention.

In a specific embodiment of the invention, a deaerator A, a circulation flow passage which circulates a liquid is formed by a tank 10 in which the liquid to be processed is stored, a first pipe 21 which is connected to the tank 10, a pump 30 which constitutes a supply means and sucks the liquid from the tank 10 by way of the first pipe 21 and supplies the pressurized liquid to a downstream side, and a second pipe 22 which discharges the liquid which is supplied by the pump 30 to the tank 10. In FIG. 1, numeral 11 indicates a float-type lid set afloat on the tank 10.

Further, a deaerating pipe 40 for performing the deaeration of the liquid is interposed in a middle portion of the second pipe 22, while a vacuum pump 50 which constitutes a suction portion for sucking and evacuating gases separated from the liquid in the deaerating pipe 40 is connected to the deaerating pipe 40.

Further, the deaerator A includes a control part 60 which controls the pump 30. A flow rate sensor 23 which is provided to the second pipe 22 between the pump 30 and the deaerating pipe 40 detects a flow rate of the liquid which is supplied through the second pipe 22, and a detection result of the flow rate sensor 23 is inputted to the control part 60. The control part 60 performs the driving adjustment of the pump 30 based on the detection result of the flow rate sensor 23 so as to supply a predetermined flow rate of the liquid to the deaerating pipe 40. That is, the control part 60, the pressure sensor 23 and the pump 30 constitute a flow control part which adjusts the flow rate of the liquid which is supplied through the inside of the second pipe 22.

Here, in place of the adjustment of the flow rate of the liquid by controlling the pump 30 using the control part 60, a flow control valve may be interposed on the second pipe 22 in place of the flow rate sensor 23. Further, a temperature sensor which detects a temperature of the liquid is provided to the second pipe 22 in addition to the flow rate sensor 23, and the control part 60 may perform the driving control of the pump 30 when the viscosity of the liquid is largely changed due to the temperature of the liquid.

As shown in FIG. 1, a restricting body 41 which restricts the flow of the liquid is provided to the deaerating pipe 40, wherein a narrowed flow passage 42 which decreases an inner diameter of the deaerating pipe 40 is formed by this restricting body 41.

Particularly, in this embodiment, the restricting body 41 is formed as a thick wall portion which bulges an inner peripheral surface of the deaerating pipe 40 inwardly and hence, the narrowed flow passage 42 is arranged at the center of the restricting body 41 in a penetrating manner.

It is desirable to form the narrowed flow passage 42 parallel to the longitudinal direction of the deaerating pipe 40, wherein a length of the narrowed flow passage 42 is set to a value which conforms to a size of a cavity which is formed in the inside of the narrowed flow passage 42 as described later.

A rip-out point 43 which generates the cavitation is formed on an upstream-side end periphery of the restricting body 41.

In this embodiment, the restricting body 41 has an upstream-side end surface 44 thereof arranged orthogonal to the longitudinal direction of the deaerating pipe 40 and has the narrowed flow passage 42 arranged parallel to the longitudinal direction of the deaerating pipe 40 thus forming the rip-out point 43 having a right-angular shape by forming the end periphery of the restricting body 41 in a right angular corner.

In this manner, the rip-out point 43 is formed by intersecting the upstream-side end surface 44 of the restricting body 41 and the inner peripheral surface of the narrowed flow passage 42 which constitutes a peripheral surface of the restricting body 41 at a right angle and hence, it is possible to easily rip out the liquid in the inside of the deaerating pipe 40 from the inner peripheral surface of the narrowed flow passage 42 whereby it is possible to generate the cavity attribute to the super cavitation as described later on the downstream side of the rip-out point 43 from a state in which a flow speed of the liquid is relatively low.

Here, the shape of the rip-out point 43 is not limited to a right-angle shape. For example, the rip-out point 43 may be formed of a projection which has a tip of an acute angle. Further, provided that the cavity is generated by the super cavitation, the rip-out point 43 may be formed of a projection which has a tip of an obtuse angle.

Figure 2:
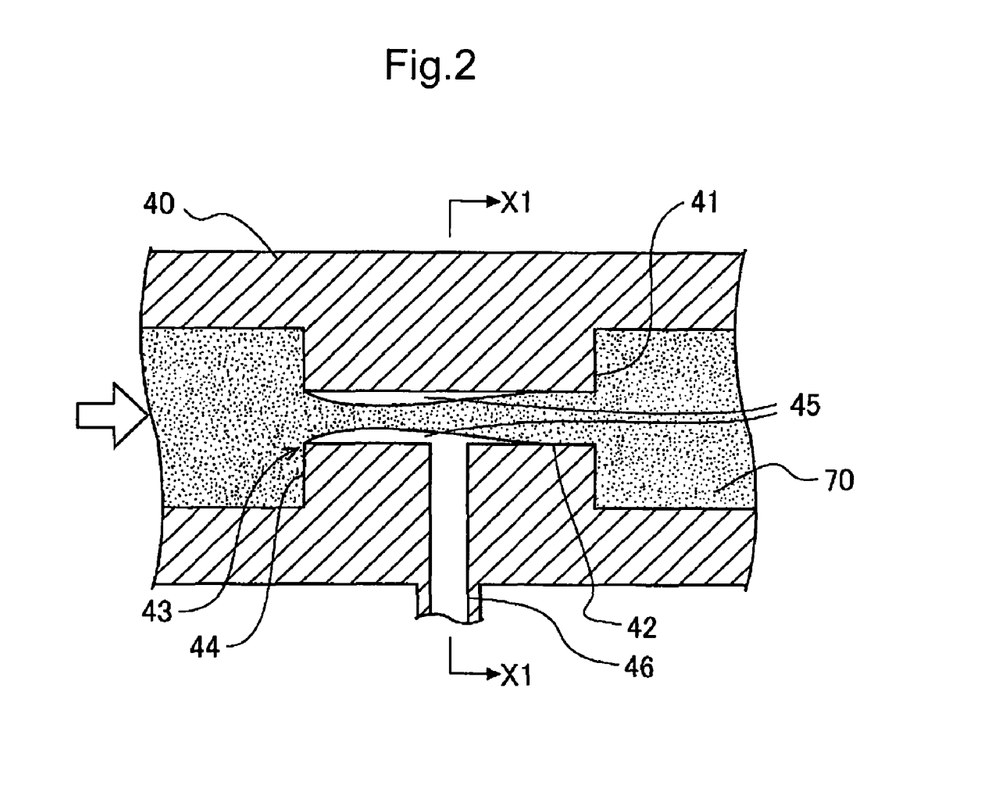
FIG. 2 is a longitudinal cross-sectional view of a deaerating pipe.

By forming the narrowed flow passage 42 using the restricting body 41 on the downstream side of the rip-out point 43, it is possible to lower a dynamic pressure of the liquid by increasing a flow speed of the liquid when the liquid passes the narrowed flow passage 42 and hence, the cavitation which is generated at the rip-out point 43 is allowed to sufficiently develop thus generating the super cavitation whereby the cavity 45 is generated on the downstream side of the rip-out point 43 (see FIG. 2).

In this embodiment, although the rip-out point 43 is fixedly formed on the upstream-side end surface of the restricting body 41, the present invention is not limited to the case in which the rip-out point 43 is formed on the upstream-side end surface of the restricting body 41. For example, a protruding projection is disposed in the inside of the narrowed flow passage 42 and the rip-out point 43 is formed of such a projection. Further, a protrusion of the projection which constitutes the rip-out point 43 may be adjustable and the super cavitation generating conditions may be adjusted by adjusting a protrusion of the projection.

A through hole 46 which is communicably connected with the narrowed flow passage 42 is formed in the deaerating pipe 40 and a vacuum pump 50 can suck air in the inside of the cavity which is formed in the narrowed flow passage 42 via the through hole 46.

That is, one end of a suction pipe 47 is connected to the through hole 46 in the deaerating pipe 40 and, at the same time, the other end of the suction pipe 47 is connected to the vacuum pump 50 thus allowing the deaerating pipe 40 and the vacuum pump 50 to communicate with each other via the suction pipe 47.

In FIG. 1, numeral 48 indicates an open-close valve which is interposed on the suction pipe 47, wherein the open-close valve 48 prevents a fluid from flowing into the vacuum pump 50 through the suction pipe 47 until the cavity 45 is formed by the super cavitation in the narrowed flow passage 42. A control part 60 performs an open-close control of the open-close valve 48, wherein after the supply of the liquid into the inside of the second pipe 22 is started with a flow speed which enables the formation of the cavity 45 in the narrowed flow passage 42 by the super cavitation, the vacuum pump 50 is operated and, at the same time, the open-close valve 48 is changed over from a closing state to a opening state.

Further, the through hole 46 may be arranged in any position of the deaerating pipe 40 provided that the cavity 45 which is generated by the super cavitation and the through hole 46 are communicably connected with each other.

Further, a pressure meter 49 is mounted on the suction pipe 47 between the through hole 46 and the open-close valve 48, and upon detection of the drop of the pressure in the inside of the through hole 46 by the pressure meter 49, a moment that the cavity 45 is formed in the narrowed flow passage 42 can be detected.

In the deaerator A having such a constitution, when the fluid is supplied to the second pipe 22 at a predetermined speed by the flow control part which is constituted of the control part 60, the pressure sensor 23 and the pump 30, as shown in FIG. 2, the cavitation which is generated at the rip-out point 43 is developed in the narrowed flow passage 42 thus forming the super cavitation and, eventually, the cavity 45 is formed on the downstream side of the rip-out point 43.

Here, in the deaerator A of this embodiment, the tank 10 is provided on the downstream side of the deaerating pipe 40. In this manner, by providing a dynamic pressure reducing part which reduces a dynamic pressure acting on the liquid such as the tank 10 on the downstream side of the deaerating pipe 40, it is possible to easily form the cavity 45 in the narrowed flow passage 42. The dynamic pressure reducing part is not limited to a vessel like the tank 10 in which the dynamic pressure acting on the liquid is released, and it may be possible to provide a pipe having a flow passage cross-sectional area which can largely decrease the dynamic pressure compared to that acting on the liquid in the narrowed flow passage 42 of the deaerating pipe 40 on the downstream side of the restricting body 41.

Figure 3:
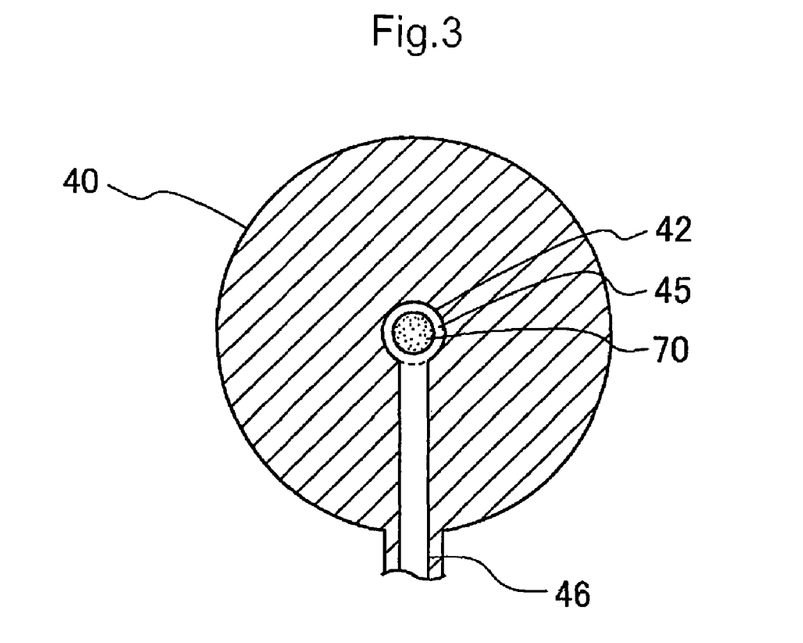
FIG. 3 is a cross-sectional view taken along a line X1-X1 in FIG. 2.

FIG. 3 is a schematic cross-sectional view taken along a line X1-X1 in FIG. 2, wherein along with the formation of the cavity 45, the liquid 70 which flows in the narrowed flow passage 42 is let flow in a center portion of the narrowed flow passage 42 in such a way that the liquid 70 does not contact with the inner peripheral surface of the narrowed flow passage 42.

Here, the inside of the cavity 45 is kept at an extremely low pressure (approximately 10 hPa) which is determined based on the vapor pressure and the quantity of air dissolved in the liquid 70, and the liquid 70 which fills the inside of the open-close valve 48 and the through hole 46 is sucked by the extremely-low-pressure action of the cavity 25.

Further, in the liquid 70 which flows in contact with the cavity 45, the pressure is remarkably low on an interface with the cavity 45 and hence, the liquid 70 is evaporated and, at the same time, gasses which are dissolved in the liquid 70 are separated whereby the vapor of the liquid 70 and gasses which are separated from the liquid 70 are present in the cavity 45. Here, when the vapor pressure of the liquid 70 is low, a generated vapor quantity of the liquid 70 is extremely small.

The gasses and vapor which are separated into the cavity 45 out of the liquid 70 are exhausted to the outside of the deaerating pipe 40 by operating the vacuum pump 50 while the open-close valve 48 is held in a opening state, and thus preventing the establishment of the equilibrium among the separated gasses and the consequent termination of the gas separation inside the cavity 45.

In this manner, in the deaerator A, the gasses dissolved in the liquid 70 are separated by making use of the cavity 45 generated in the deaerating pipe 40 by the super cavitation, and the separated gasses are continuously exhausted by the vacuum pump 50.

Figure 4:
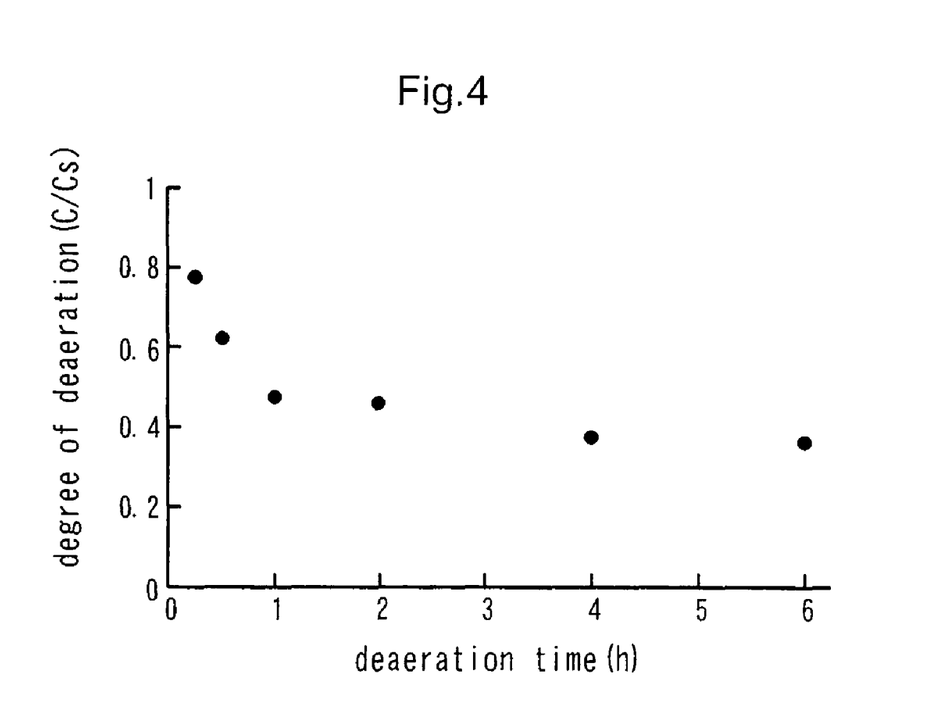
FIG. 4 is a degree-of-deaeration transition graph which shows the change of the degree of deaeration of oil deaerated by the deaerator according to the embodiment of the present invention.

As a specific example, FIG. 4 shows a change of degree of deaeration when oil is used for the liquid 70 and a total volume of 40 litters of oil is processed by the deaerator a shown in FIG. 1.

Here, in the deaerating pipe 40, the narrowed flow passage 42 having an inner diameter of 2 mm is formed by the restricting body 41 which constitutes a cylindrical constriction. The upstream pressure which is the pressure on the upstream side of the deaerating pipe 40 is set at 3.5 MPa and the downstream pressure which is the pressure on the downstream side of the deaerating pipe 40 is set at 0.03 MPa and, further, a flow rate is set to be 201 cc/s. Here, the temperature of oil is kept at 25° C. Since the vapor pressure of the oil is extremely low, the oil is hardly evaporated in the inside of the cavity 45.

As shown in FIG. 4, the deaeration progresses with the air solubility down to approximately 0.8 in 15 minutes and, thereafter, along with the lapse of time, the deaeration further progresses, and the degree of deaeration which is the air solubility becomes 0.36 after a lapse of 6 hours.

Here, the gas such as air is liable to easily dissolve in the deaerated oil and hence, even the oil merely contacting with air can contain air in solution, which may deteriorate the degree of deaeration. Accordingly, in this embodiment, as shown in FIG. 1, the tank 10 which is arranged on the downstream side of the deaerating pipe 40 is provided with a float-type lid 11 thus suppressing the contact between the deaerated oil and the atmosphere.

In FIG. 4, although the degree of deaeration is saturated at approximately 0.4, there exists a high possibility that this saturation of the degree of deaeration is attributed to the capacity of the vacuum pump 40 used in the deaeration. Accordingly, by enhancing the degree of vacuum in the inside of the cavity 45 using a vacuum pump having a higher capacity, it is possible to enhance the degree of deaeration.

Further, as a method of further enhancing the degree of deaeration, it may be useful to increase a contact area per a unit time between the liquid 70 and the cavity 45. In the concrete, it may be conceived as a method to increase a flow speed of the liquid 70 or to increase a surface area of the cavity 45.

Figure 5:
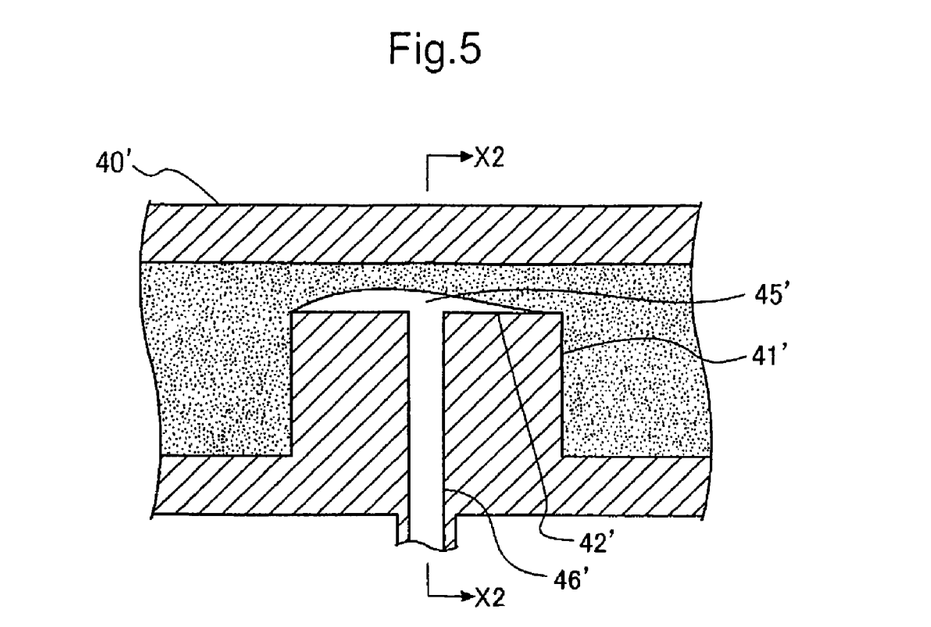
FIG. 5 is a longitudinal cross-sectional view of a deaerating pipe of another embodiment.
Figure 6:
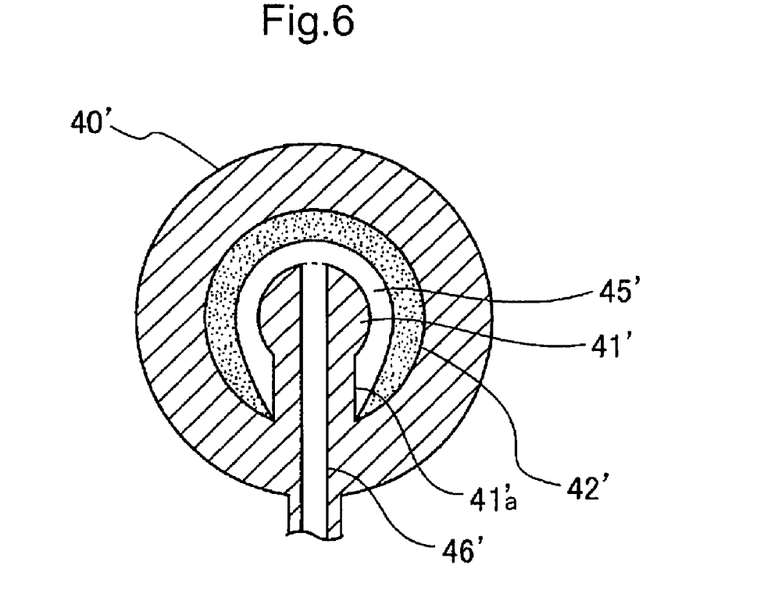
FIG. 6 is a cross-sectional view taken along a line X2-X2 in FIG. 5.

As a method for increasing the surface area of the cavity 45, in place of forming the narrowed flow passage 42 at the center portion of the deaerating pipe 40 shown in FIG. 2 and FIG. 3, it is preferable to arrange a restricting body 41' at a center portion of a deaerating pipe 40' and by arranging a narrowed flow passage 42' such that the narrowed flow passage 42' surrounds the restricting body 41' as shown in FIG. 5 and FIG. 6. FIG. 6 is a cross-sectional view taken along a line X2-X2 in FIG. 5.

In this manner, when the restricting body 41' is arranged at the center portion of the deaerating pipe 40 and the narrowed flow passage 42' having a C-shaped cross section is formed around the restricting body 41', it is possible to increase the contact area between a peripheral surface of the restricting body 41' and the liquid without lowering a flow speed of the liquid which passes through the narrowed flow passage 42' whereby it is possible to form a cavity 45' having a large surface area.

In FIG. 6, numeral 41'a indicates a support body which supports the restricting body 41'. By forming a through hole 46' in the support body 41'a portion, it is possible to form the through hole 46' without disturbing the flow of the liquid which passes through the narrowed flow passage 42'.

In the deaerator A of this embodiment, bubbles are inevitably generated in the liquid which passes through the deaerating pipe 40 immediately after the starting of the deaeration process, circulate with the liquid for some time, and are gradually removed as the deaeration progresses.

Figure 7:
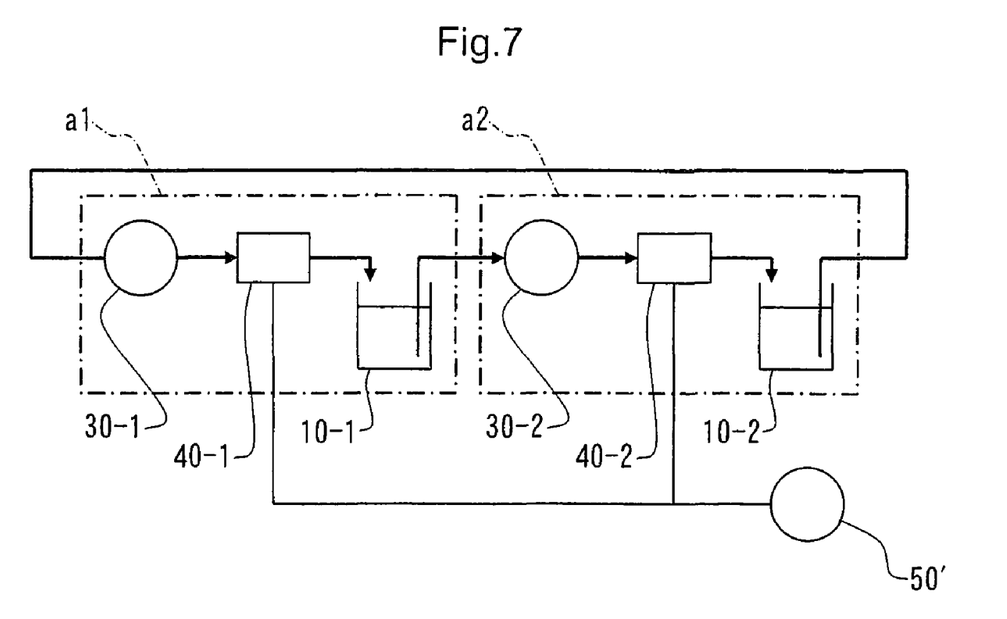
FIG. 7 is a general schematic view of a deaerator which includes a first deaerating portion and a second deaerating portion.

Accordingly, as exemplified schematically in FIG. 7, the following constitution may be adopted to prevent the circulation of the liquid which contains the bubbles. That is, a first deaerating part a1 is constituted of a first pump 30-1 which can adjust a supply quantity of the liquid, a first deaerating pipe 40-1 and a first tank 10-1 which forms a dynamic pressure reducing part, a second deaerating part a2 is also constituted of a second pump 30-2 which can adjust a supply quantity of the liquid in the same manner, a second deaerating pipe 40-2 and a second tank 10-2 which forms a dynamic pressure reducing part, and the first deaerating part a1 and the second deaerating part a2 are connected in series, whereby the bubbles generated in the first deaerating part a1 can be removed from the liquid in the second deaerating part a2.

Here, in order to reduce the cost of equipment, both the first deaerating part a1 and the second deaerating part a2 use the vacuum pump 50' in common, which is connected to the first deaerating pipe 40-1 and the second deaerating pipe 40-2.

Further, to further enhance the deaeration ability per unit time, it is possible to connect not only two deaerating parts in series but also more than two in series.

Further, when the deaerating parts, each of which is constituted of a pump, a deaerating pipe and a dynamic pressure reducing portion, are connected in series, it is also possible to perform the separation of liquids which have different vapor pressures. For example, it is possible to use the deaerator for removing water from oil-water mixture.

When a liquid which has a high vapor pressure is circulated through the A of the present invention, the gas discharged from the vacuum pump 50 can be the vapor of the liquid and hence, the deaerator A can be used as an evaporator.

Further, although the deaeration is performed by discharging the gas separated into the cavity 45 which is formed in the constricted flow passage 42 in the deaerator A of the present invention, it may be also possible to dissolve a desired gas into the liquid by supplying the desired gas into the cavity 45 and thus enhancing the concentration of the gas inside the cavity 45.

To be more specific, for example, in water used in food processing, it is possible that the deaeration is first conducted as usual to remove oxygen dissolved in water, and nitrogen is next dissolved in the deaerated water, which makes low oxygen water.

By reducing oxygen concentration in water in this manner, it is possible to prevent the degeneration of food such as the oxidation of food caused by oxygen dissolved in water. Accordingly, products such as pickles and bean curds which are handled in a water-immersed state hardly deteriorate and their preservation properties can be enhanced.

Here, the nitrogen is dissolved in the low oxygen water for suppressing the natural dissolution of the oxygen into water after deaeration.

In this manner, the deaerator of the present invention can be also utilized as a gas-dissolving device.

The deaerator of the present invention can be used in deaeration of various kinds of liquids. Particularly, when the deaerator is incorporated in a mechanical system which includes oil hydraulic circuits, it is possible to reduce the possibility of bubble generation in the system by deaerating the working oil. Further, when the deaerator is incorporated in the water-supply unit used in food processing, oxygen can be removed from water and hence, the influence of dissolved oxygen can be substantially reduced.

What I claimed is:

1. A deaerator which performs the deaeration of a liquid supplied to the inside of a pipe by a supply means, the deaerator comprising:

a flow control portion which adjusts a flow rate of the liquid supplied through the inside of the pipe;

a rip-out portion which creates a cavity in contact with an inner peripheral surface of the pipe by ripping out the liquid from the inner wall of the pipe; and, at the same time, a suction portion which sucks a gas inside the cavity through a through hole which is machined in the pipe so that the through hole communicates with the cavity.

2. A deaerator according to claim 1, wherein a restricting body which restricts the flow of the liquid is provided in the inside of the pipe so as to form a constricted flow passage in the inside of the pipe and, at the same time, the cavity is formed in the inside of the constricted flow passage.

3. A deaerator according to claim 2, wherein a dynamic pressure reducing portion which reduces a dynamic pressure of the liquid is provided on a downstream side of the restricting body.

4. A deaerator according to claim 3, wherein a deaeration region in which the rip-out portion, the suction portion and the dynamic pressure reducing portion are arranged in this order is provided in multiple stages in the pipe.

5. A deaerator according to claim 3, wherein the dynamic pressure reducing portion is a tank which temporarily reserves the liquid.

6. A deaerator according to any one of claims 2 to 5, wherein the rip-out portion is formed by intersecting an upstream-side end surface of the restricting body with a peripheral surface of the constricted passage in the restricting body.

7. A deaerating method which performs the deaeration of a liquid which is supplied to the inside of a pipe by a supply means, wherein a rip-out portion which rips out the liquid from an inner peripheral surface of the pipe is provided at a predetermined position in the inside of the pipe, a through hole which communicates with a suction means which exhausts gases in the inside of the pipe is formed in the pipe on a downstream side of the rip-out portion, and a liquid is supplied into the inside of the pipe at a predetermined flow rate by a flow control means which adjusts a flow rate of the liquid supplied into the inside of the pipe, and a cavity which communicates with the through hole is formed at a downstream side of the rip-out portion, and the gases in the inside of the cavity are exhausted by a suction means thus deaerating the liquid.

* * * * *